United States Patent
Kawabe et al.

[15] 3,694,039
[45] Sept. 26, 1972

[54] SAFETY MECHANISM FOR BRAKE HOLDER OF AUTOMOTIVE HYDRAULIC BRAKE SYSTEM

[72] Inventors: Tsuneo Kawabe; Naoji Sakakibara; Yasuhiro Kawabata, all of c/o Aisin Seiki Company Limited 1, Tenno, Takaokashinmachi, Toyota-shi, Aichi-ken, Japan

[22] Filed: Dec. 31, 1969

[21] Appl. No.: 889,576

[52] U.S. Cl. .......... 303/21 CF, 180/105 E, 192/3 H, 303/20, 317/5
[51] Int. Cl. .................. B60t 8/08, F16d 67/02
[58] Field of Search..188/181; 192/0.049, 13 A, 3 H; 303/21, 20, 75, 89; 180/82, 105 E, 114; 317/148.5, 5

[56] References Cited

UNITED STATES PATENTS

| | | |
|---|---|---|
| 3,525,553 | 8/1970 | Carp et al................303/21 P |
| 3,494,671 | 2/1970 | Slavin et al..............303/21 P |
| 3,026,148 | 3/1962 | Ruof....................303/21 CG |
| 3,469,662 | 9/1969 | Dewar...................303/21 CG |
| 3,184,606 | 5/1965 | Ovenden et al........303/21 CE UX |
| 3,233,153 | 1/1966 | Ryan...............303/21 CF UX |
| 3,500,190 | 3/1970 | Michon...........303/21 EB UX |
| 3,511,542 | 5/1970 | Fielek, Jr. .............303/21 CG |
| 3,563,611 | 2/1971 | Sharp....................303/21 CF |
| 3,578,819 | 5/1971 | Atkins......................303/21 P |

Primary Examiner—Milton Buchler
Assistant Examiner—Stephen G. Kunin
Attorney—Cumpston, Shaw & Stephens

[57] ABSTRACT

A hydraulic brake system including a brake holder for holding a vehicle still after it has stopped is improved by using a signal generator producing pulses proportional to the rotation of one of the wheels, a circuit for integrating the pulses to a corresponding voltage, and apparatus for delaying the actuation of the control valve until the integrated voltage drops to a predetermined value to delay the brake holder for longer times at higher vehicle speeds to allow the driver time to release the brake pressure for wheel-locking or skidding at higher speeds.

7 Claims, 10 Drawing Figures

SAFETY MECHANISM FOR BRAKE HOLDER OF AUTOMOTIVE HYDRAULIC BRAKE SYSTEM

This invention relates to certain improvements in and relating to a safety circuit adapted for use with a vehicle hydraulic brake pressure holder briefly referred to hereinafter as "brake holder."

As commonly known, the hydraulic brake system is generally used as the service brake means for the wheeled vehicle, and the brake holder is incorporated therein and includes a powered and preferably solenoid-operated control valve inserted in a conduit connecting the conventional master cylinder and the conventional wheel cylinder means of the hydraulic brake system. The control valve is actuated by an electric instruction signal produced during brake application by a sensing means detecting a stopping of at least one of the wheels of the vehicle. The control valve then maintains the hydraulic brake pressure hitherto applied from the master cylinder to the vehicle wheels.

Release of the brake holder from its brake pressure holding position is generally accomplished when the vehicle driver actuates the clutch pedal or accelerator pedal for starting the vehicle running. This actuates a switch to interrupt the hitherto maintained current to the solenoid valve so as to release the latter from its operating position to bring the hydraulic brake pressure applied to the wheel cylinders into communication with the interior of the reservoir section of the master cylinder.

When an automotive vehicle fitted with the brake holder of the above kind is provisionally stopped in heavy traffic, at a stop signal, railroad crossing or the like, the hydraulic brake pressure may be maintained without continued brake pedal actuation or use of the parking brake.

If the vehicle is fitted with a conventional torque converter, the employment of the brake holder will act effectively to eliminate vehicle creeping and hence relieve the driver of this responsibility. In addition, the brake holder contributes considerably to increase the safety of frequent halts in heavy traffic.

It should be noted however that when the driver applies a sudden and considerable braking effort for stopping a running vehicle which is fitted with a conventional brake holder and a wheel lock is invited by the excess braking operation, the brake pressure will be continuously applied and the locked wheel would not be released, even if he should loosen his foot pressure acting upon the brake pedal for the purpose of freeing the wheel lock. The actuated condition of the brake holder causes this because the stop instruction signal hitherto developed and maintained by the occurrence of the wheel lock is being fed to the brake holder. Such operational condition would lead to a disabled steering and/or a disadvantageously and dangerously continued wheel lock which may result in a grave traffic accident.

It is therefore the main object of the invention to provide an effective safety means for obviating the aforementioned conventional drawbacks.

The basic technical idea for attaining the above mentioned and other objects which will become apparent from the following detailed description to be set forth, is that in case of increased vehicle speed, the time interval extending from the time point where a stopping of wheel rotation initiated to that where the brake holder initiates its effective function, said time interval being referred to herein as the "time lag," is set to a larger value than those otherwise available, for allowing the driver time to loosen his braking effort for a lesser brake application even upon a continued occurrence of a wheel lock. By providing this measure for providing a longer time lag of the brake holder actuation in the aforementioned sense, so as to meet with the modern tendency of vehicles high speed, it is now possible to allow the vehicle driver who feels a danger of continued wheel lock or vehicle skid, to loosen the once applied brake pedal pressure for adopting a lesser brake application force than that would invite a wheel lock.

These and further objects, features and advantages of the invention will become more apparent from the following detailed description of the invention by reference to the accompanying drawings, in which.

Figure 1:
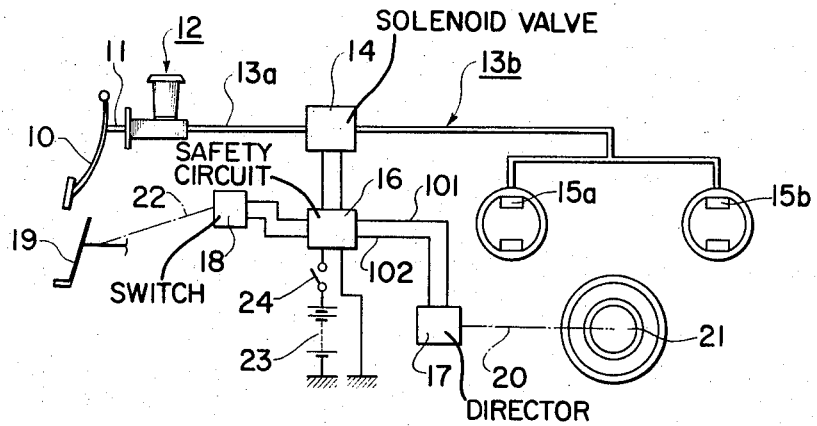
FIG. 1 is a schematic explanatory view of a hydraulic vehicle brake arrangement fitted with the electronic safety circuit as preferred embodiment of the invention.

In FIG. 1, the numeral 10 represents in a highly simplified form a conventional brake pedal which is mechanically connected through connecting means, preferably pusher rod 11, with a conventional master cylinder 12. As usual, an elevated hydraulic pressure will be generated in the master cylinder 12 as a function of manual foot pressure exerted upon the brake pedal 10. The thus boosted-up hydraulic pressure is conveyed through a piping 13a, a solenoid valve 14 and a further piping means 13b, hydraulically connected one after another, to conventional wheel cylinder 15a and 15b only schematically shown, said valve 14 being designed and arranged for on-off control of the hydraulic connection between the hydraulic pipings 13a and 13b.

The numeral 17 represents an electric director which is formed into a rotary interrupter mechanically and operatively connected by mechanical means such as a flexible shaft or the like, shown in a highly simplified form by a dash-dotted line 20, with one of the vehicle wheels as at 21, although detailed construction of the director have not been shown only for simplicity of the drawing and on account of easy availability to any person skilled in the art. As will be easily understood, the director 17 will deliver a series of pulses as a function of the rotational speed of the vehicle wheel means 21, said output pulses being conveyed through lead means 101 to an input terminal 100 provided in a safety circuit shown in a block 16 in FIG. 1 and specifically in detail in FIG. 2. The director 17 has a return lead 102 leading to earth as shown. As will be described more specifically hereinafter, the circuit 16 acts to operate the solenoid valve 14 for actuation of brake holder means when a stop signal is received from said director, the solenoid coil of the valve being shown specifically at 14a in FIG. 2.

A switch 18 is connected operatively by means of a mechanical or the like connection means, shown in a highly simplified way by a dash-dotted line 22, with a conventional clutch pedal 19. When the clutch pedal is actuated for starting the vehicle, the switch 18 is actuated so as to release the solenoid valve 14 by de-energizing its actuating coil 14a. By release of the valve 14, any accumulated hydraulic brake pressure will be discharged.

There is provided a battery 23, the negative side of which is connected to earth as shown, while the positive side of the battery is connected to a conventional ignition switch of the engine of the vehicle, not shown.

Figure 2:
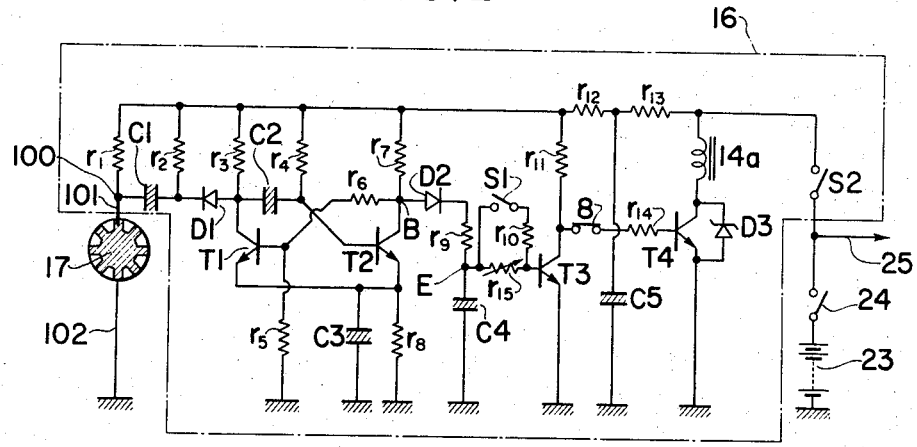
FIG. 2 is a connection diagram illustrative of a preferred embodiment of the electronic safety circuit according to the invention.
Figure 3A:
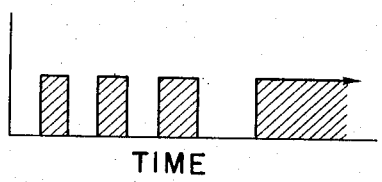
FIG. 3(a) shows a pulse pattern produced in the inventive system by a vehicle wheel moving slowly and slowing down.
Figure 3B:
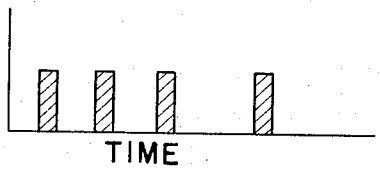
FIG. 3(b) shows the conversion of the pulses of FIG. 3(a) in the circuit of FIG. 2.
Figure 3C:
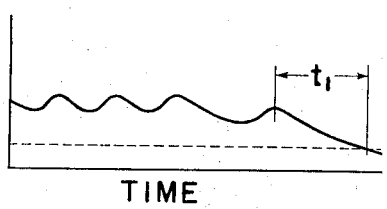
FIG. 3(c) shows the integration of the pulses of FIG. 3(b) with switch S1 open.
Figure 3D:
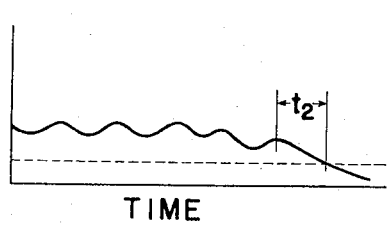
FIG. 3(d) shows the integration of the pulses of FIG. 3(b) with switch S1 closed.
Figure 4A:
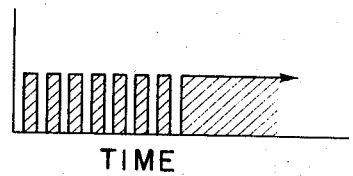
FIG. 4(a) shows a pulse pattern produced in the inventive system by a vehicle wheel rotating at a faster rate than represented in FIG. 3(a)
Figure 4B:
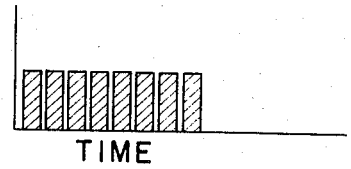
FIG. 4(b) shows the conversion of the pulses of FIG. 4(a)
Figure 4C:
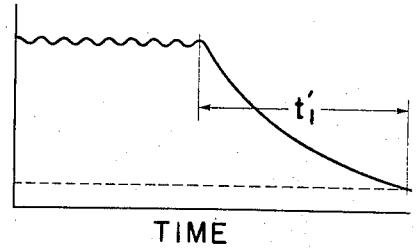
FIG. 4(c) shows the integration of the pulses of FIG. 4(b) with switch S1 open.
Figure 4D:
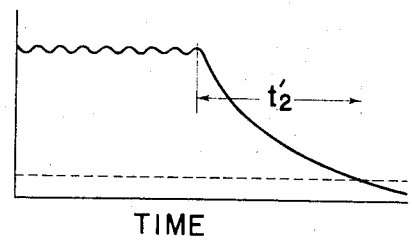
FIG. 4(d) shows the integration of the pulses of FIG. 4(b) with switch S1 closed.

In the circuit diagram shown in FIG. 2, r1-r14 and r4 denote respective fixed resistors electrically connected as shown, while r15 represents a variable resistor. C1-C5 are condensers, while D1-D5 are diodes. T1-T4 represent respective transistors. S1 represents a switch adapted for switching to the time lag operation, while S2 is a main switch for the brake holder. A lead 25 extends from the stationary contact side of said switch 24 to a conventional electrical ignition means such as the primary side of an ignition coil, not shown.

The operation of the arrangement so far shown and described is as follows:

When the vehicle runs at a slow speed, a series of pulses having coarser successive pitches will be delivered from the director 17 through the lead 101 to the terminal 100, this pulse series being shown by way of example at (a) of FIG. 3. These pulses are fed to a differentiating circuit comprising condenser C1 and resistor r2, and the differentiated output is fed as a trigger signal upon passage through the diode D1 to a monostable multivibrator comprising transistors T1 and T2, and resistors r3-r8. As will be easily supposed from the foregoing, transistor T2 of the monostable multivibrator is interrupted each time upon reception of a trigger pulse fed through the diode D1 for a certain time period as determined by the combination of condenser C2 and resistor r4, as represented schematically at (b) in FIG. 3. It is seen that upon reception of each pulse from the pulse series shown at (a) in FIG. 3, the potential appearing at the point B in FIG. 2 will be elevated for a certain predetermined time period during the conductive period of one pulse of the pulse series shown at ( b). The thus appearing pulse series is processed in the integrating circuit comprising resistor r9 and condenser C4, and thus, an output of a wavy mode shown by way of example at (c) in FIG. 3 will appear at the point E shown in FIG. 2. When the vehicle is brought to a dead stop, the potential appearing at the point E will drop to a low level shown by a broken line at (c) in FIG. 3, this potential dropping time period being shown at t1 at ) in c)in the same figure. After lapse of this period t1, the transistor T4 will turn on, and current will be conveyed through the solenoid coil 14a of valve 14, the latter being thus actuated to maintain the hydraulic brake pressure.

On the contrary, when the vehicle runs at a high speed, the pulse series appearing at the input terminal 100 will be of the more dense one, such as, for instance, shown at (a) of FIG. 4. The number of the pulses will be more numerous than before, and the differentiated pulse series will also become more dense than before, as shown at FIG. 4 (b) in the same figure. The integrated output appearing at the point E will be of a higher level as shown at (c) in FIG. 4, than the case shown at (c) in FIG. 3.

The time period t1' extending from the said high level situation to a certain lower level shown equally by a dotted horizontal straight line which represents the corresponding voltage when the vehicle wheel is locked in a skid condition, is longer than the corresponding time shown at t1 in FIG. 3. During lapse of this period t1', the solenoid valve 14 is not brought into actuation. Therefore, by selecting this period t1' to a certain proper value, the vehicle driver may become aware of an excessive brake application resulting in a wheel lock and he can loosen the hitherto applied excessive manual effort on the brake pedal, so as to release the said wheel lock.

When the switch S1 is closed, the time lag t1 or t1' will be shortened to t2 or t2' shown at (d) respectively in FIG. 3 or 4, by virtue of short-circuiting the variable resistor r15. The conditions shown at (c) in FIG. 3 or 4 are selected to meet with snow, rainy or the like bad weather, where more frequent wheel slips may be feared.

When driving on a dry or more favorable road surface liable to invite considerably lesser wheel slip troubles, the said kind of time lag must be shortened correspondingly. The switch S1 is closed for this purpose. The results are shown by way of example at (a) in FIG. 3 or 4, respectively.

The time lag may normally and under favorable running conditions be set to 0.3–0.5 second when driving on a paved and dry road surface with the vehicle stopped rather gradually, in the case of a personal car. When driving on an unfavorable road surface such as wet and non-paved one, the time lag may be extended preferably to 1 second.

An example of standard circuit element data adapted for the circuit shown in FIG. 2 may be as follows, although these are not limitative of the invention.

| Resistors | Kilo-ohms |
|---|---|
| r1 | 11 1 k. ohms |
| r2 | 3 " |
| r3 | 1.5 " |
| r4 | 22 " |
| r5 | 22 " |
| r6 | 10 " |
| r7 | 1.7 " |
| r8 | 50 ohms |
| r9 | 3 k. ohms |
| r10 | 2 " |
| r11 | 680 ohms |
| r12 | 5 " |
| r13 | 5 " |
| r14 | 200 " |

| Condensers | Microfarads |
| --- | --- |
| C1 | 1 |
| C2 | 0.5 |
| C3 | 10 |
| C4 | 200 |
| C5 | 10 |

With the resistance value of variable resistor R-15 at 2 kilo-ohms, and the other data conforming to those listed above, then the time lag may be as follows:

1. when stopping gradually from a speed of 1.5 km/h, then the time lag may be 0.3–0.5 second;
2. when stopping suddenly from a speed of 15 km/h to a skidding condition, the time lag may be about 1.7 seconds;
3. when stopping suddenly from a speed of 30 km or higher, the time lag may be about 2.0 seconds; as ascertained by our practical experiments.

It will be clear from the foregoing that with use of the device according to this invention, the brake holder is brought into actuation directly upon stopping of the vehicle wheels when the driver brakes in the normal or rather gradually acting manner. In the case of brake application rather suddenly from a high speed running, to such a degree that a wheel lock is thereby introduced, the time period counted from the initiation of the wheel lock to the actuation of the brake holder, said period being denoted as "time lag," is varied with the vehicle running speed, so that the driver may loosen his excessively applied manual braking effort upon the brake pedal for release of the invited wheel lock. In this way, the desirable safety of the brake holder may be increased correspondingly. There is provided a switch S1 between the integrating circuit and the power amplifier means so as to modify the electric resistance of the connecting passage therebetween, for adjusting, the time lag of the brake holder to different road surface conditions. The principles proposed by the present invention may, if necessary, be applied to automatic door lock mechanisms, automatic light deflection means or the like, so as to take variable road surface conditions into account for the proper functioning of these conventional applicances.

The embodiments of the invention in which an exclusive property or privilege is claimed are as follows:

1. In a hydraulic vehicle wheel brake system having a brake holder including a control valve actuated upon detection of said vehicle coming to a stop to hold the vehicle still until deliberate release of said brake holder, the improvement comprising:
   a. a signal generator for producing pulses proportional to the rotation of at least one of said vehicle wheels;
   b. a circuit for integrating said pulses into a corresponding voltage signal as a function of said wheel speed; and
   c. delay means for actuating said control valve only when said voltage signal drops to a predetermined value to delay said control valve actuation for times that are longer at higher speeds of said vehicle.

2. The system of claim 1 including means for varying the rate of discharge of said integrated voltage signal to vary said time delay for different road conditions.

3. The system of claim 2 wherein said discharge rate varying means includes a variable resistor.

4. The system of claim 2 wherein said signal generator is a dynamo-type pulse generator mechanically connected to said one vehicle wheel.

5. In a hydraulic vehicle wheel brake system for the wheels of a powered vehicle, comprising wheel cylinder means, a master cylinder, a piping system connected hydraulically between said master cylinder and wheel cylinder means, and an electromagnetically operated hydraulic brake pressure control means inserted in said piping system for control of the hydraulic brake pressure supplied to said wheel cylinder means, the improvement comprising a brake holder electrically connected with said hydraulic brake pressure control means, said brake holder comprising a first circuit means for generating an electrical signal current responsive to the rotational speed of one of said wheels, said first circuit means comprising a signal generator mechanically coupled with one of said wheels for unitary rotation therewith and adapted for generating a series of electrical current pulses in response thereto, a second circuit means for converting said signal current into a corresponding signal voltage, said second circuit means comprising an integrator electrically connected with said signal generator for conversion of said current pulses into a series of corresponding voltage pulses, said hydraulic brake pressure control means being adapted for interrupting fluid passage flow through said piping system to said wheel cylinder means when said voltage signal received from said brake holder drops beyond a predetermined value, a switch means between said integrator and said control means for actuation upon lowering of said voltage signal below said predetermined value, said control means having a solenoid coil responsive to said switch actuation, and a variable electrical means for making said voltage signal output from said converter circuit variable in response to road surface conditions, so as to modify the actuation period of said control means responsive thereto.

6. The hydraulic vehicle wheel brake system as claimed in claim 5 wherein said variable electrical means is a variable resistor provided between said integrator and said switch means for modifying the electrical current input from said integrator to said switch means in response to occasional road surface conditions.

7. The hydraulic vehicle wheel brake system as claimed in claim 5 wherein said signal generator is a dynamo-type pulse generator mechanically coupled with one of said vehicle wheels.

* * * * *